(12) United States Patent
Yoneda et al.

(10) Patent No.: US 9,494,161 B2
(45) Date of Patent: Nov. 15, 2016

(54) MOTOR

(71) Applicant: NIDEC SERVO CORPORATION, Kiryu, Gumma (JP)

(72) Inventors: Koji Yoneda, Kiryu (JP); Takuma Ishii, Kiryu (JP); Eiichi Hirata, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 407 days.

(21) Appl. No.: 14/064,387

(22) Filed: Oct. 28, 2013

(65) Prior Publication Data

US 2014/0127049 A1 May 8, 2014

(30) Foreign Application Priority Data

Nov. 8, 2012 (JP) .................................. 2012-246642
Aug. 28, 2013 (JP) .................................. 2013-176556

(51) Int. Cl.

| F04D 29/66 | (2006.01) |
|---|---|
| H02K 5/24 | (2006.01) |
| F04D 25/06 | (2006.01) |
| H02K 21/22 | (2006.01) |
| H02K 7/14 | (2006.01) |

(52) U.S. Cl.
CPC .......... F04D 25/0646 (2013.01); F04D 25/062 (2013.01); F04D 25/068 (2013.01); F04D 29/668 (2013.01); H02K 5/24 (2013.01); H02K 11/33 (2016.01); H02K 21/22 (2013.01); H02K 7/14 (2013.01)

(58) Field of Classification Search
CPC .... H02K 11/0073; H02K 11/33; H02K 7/14; H02K 5/24; H02K 21/22; F04D 29/60; F04D 29/668; F04D 25/0646; F04D 25/062; F04D 25/068; H05K 1/02; F04C 2240/808
USPC ................ 310/68 R, 67 R, 85, 88; 174/255; 417/410.1, 423.7, 423.14
See application file for complete search history.

(56) References Cited

U.S. PATENT DOCUMENTS

2007/0178720 A1* 8/2007 Yoshida ................. H02K 5/225 439/74
2007/0252451 A1* 11/2007 Shibuya ................ F04D 25/068 310/64

FOREIGN PATENT DOCUMENTS

| EP | 0160262 A2 * | 11/1985 | ............. H01R 12/52 |
|---|---|---|---|
| JP | 07-075288 A | 3/1995 | |
| JP | 2005-256610 A | 9/2005 | |

* cited by examiner

*Primary Examiner* — Devon Kramer
*Assistant Examiner* — Nathan Zollinger
(74) *Attorney, Agent, or Firm* — Keating & Bennett, LLP

(57) ABSTRACT

A motor includes a cylindrical or substantially cylindrical rotor unit configured to rotate about a rotation axis; a bearing unit arranged to rotatably support the rotor unit; a bearing holder arranged to hold the bearing unit; a disc-shaped or substantially disc-shaped base to which the bearing holder is fixed; a stator unit arranged inside the rotor unit and fixed to the bearing holder; and a circuit board arranged between the base and the stator unit and held by the stator unit. The circuit board is supported on the base through an insulative and flame-retardant vibration-preventing member.

13 Claims, 4 Drawing Sheets

MOTOR

BACKGROUND OF THE INVENTION

1. Field of the Invention

The present invention relates to a motor for use in a blower or the like and, more particularly, to an improvement of a motor provided with a circuit board to which coils of a stator are connected.

2. Description of the Related Art

A centrifugal fan used as a blower for cooling electronic devices and so forth is configured such that, as a plurality of circumferentially-arranged blades is rotated by a motor about a rotation axis, axially-drawn air is radially discharged and then blown out from an exhaust port.

The centrifugal fan of this type generally has a configuration as disclosed in, e.g., Japanese Patent Application Publication No. 2005-256610. More specifically, an impeller including a ring-shaped hub extending radially outward from a rotor unit and a plurality of blades fixed to the hub and circumferentially arranged at the radial outer side of the rotor unit is fixed to the rotor unit having a substantially cylindrical portion rotating about a rotation shaft. A bearing unit for supporting the rotation shaft of the rotor unit is held inside of a bearing holder unit arranged in a base. A stator unit arranged on the inner circumference of the rotor unit is fixed to the outer surface of the bearing holder unit. A circuit board is arranged between the base and the stator unit.

In general, the circuit board is formed into a ring shape so as to be loosely fitted to the outer surface of the bearing holder unit. As disclosed in Japanese Patent Application Publication No. 2005-256610, tying pins implanted in an insulator of the stator unit are soldered to the circuit board, whereby the circuit board is supported on the stator unit. The coils of the stator unit are tied and connected to the tying pins. Thus, the coils are connected to the circuit board through the tying pins.

In the configuration in which the circuit board is supported by only the tying pins of the stator unit as set forth above, the circuit board tends to vibrate if the electromagnetic vibration generated in the stator unit is transferred to the circuit board. In addition, the circuit board may be vibrated when a part of the airflow generated by the rotation of the impeller flows around the circuit board. This may adversely affect the vibration and noise characteristics of the centrifugal fan as a whole.

A technology for solving the aforementioned problem is disclosed in, e.g., Japanese Patent Application Publication No. H07-075288. In Japanese Patent Application Publication No. H07-075288, a recess portion is formed in a counter intake port of a fan casing. A circuit board is arranged in the recess portion and is encapsulated with a resin sealant. With this structure, the circuit board is covered with the resin sealant and is fixed to the fan casing. It is therefore possible to obtain a vibration-free structure for the circuit board and to provide dustproof and waterproof effects.

In case of the configuration disclosed in Japanese Patent Application Publication No. H07-075288, however, the recess portion for the accommodation of the circuit board needs to be secured when encapsulating the circuit board with the sealant. If it is structurally impossible to provide the recess portion, a wall for covering the circuit board needs to be temporarily prepared in order to fill the sealant. This poses a problem in that the structure becomes complex. Moreover, a drying step needs to be performed after filling the sealant. Thus, there is a problem in that the number of required manufacturing steps grows larger and the installation becomes larger.

SUMMARY OF THE INVENTION

Preferred embodiments of the present invention are able to realize, with a simple structure and in a cost-effective manner, vibration prevention of a circuit board supported on a stator unit.

In accordance with a preferred embodiment of the present invention, a motor includes a cylindrical or substantially cylindrical rotor unit configured to rotate about a rotation axis; a bearing unit arranged to rotatably support the rotor unit; a bearing holder arranged to hold the bearing unit; a disc-shaped or substantially disc-shaped base to which the bearing holder is fixed; a stator unit arranged inside the rotor unit and fixed to the bearing holder; and a circuit board arranged between the base and the stator unit and held by the stator unit, wherein the circuit board is supported on the base through an insulative and flame-retardant vibration-preventing member.

According to the motor of a preferred embodiment of the present invention, the circuit board held by the stator unit is arranged between the base provided with the bearing holder and the stator unit fixed to the bearing holder. The circuit board is supported on the base through an insulative and flame-retardant vibration-preventing member. Therefore, the vibration-preventing effect of the circuit board is remarkably increased. There is no need to use a complex structure required in filling a resin sealant. It is not necessary to perform a drying step. A vibration-preventing measure can be provided with a simple configuration. In particular, it is possible to safely support the circuit board because the vibration-preventing member is insulative and flame-retardant.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will now be described with reference to the drawings which form a part hereof. In the description of the present preferred embodiments, for the sake of convenience, the up-down direction in the respective drawings will be referred to as an "up-down direction". However, the up-down direction is not intended to mean the direction available in an actual installation state. In the description of the present preferred embodiments, the direction parallel or substantially parallel to the rotation axis will be referred to as an "axial direction". The radius direction about the rotation axis will be referred to as a "radial direction". The present invention is not limited to the preferred embodiments described below but may be appropriately modified without departing from the scope proving the effects of the present invention.

Figure 1:
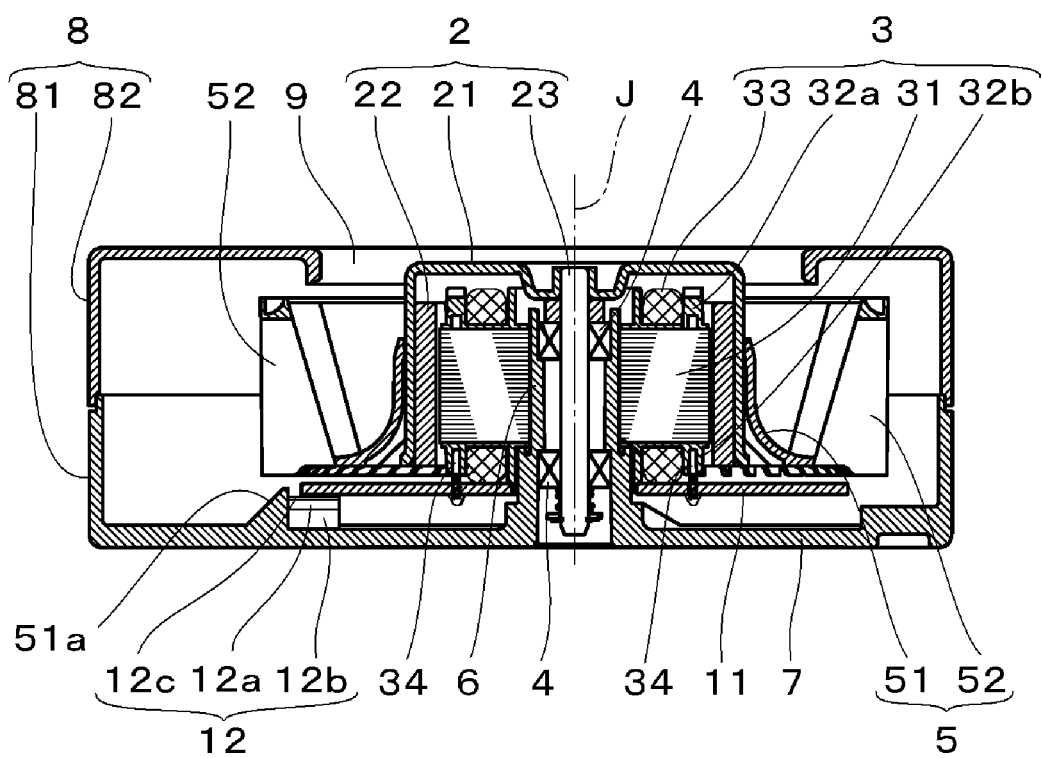
FIG. 1 is a section view of a centrifugal fan provided with a motor according to a preferred embodiment of the present invention.

FIG. 1 is a section view schematically showing the configuration of a centrifugal fan provided with a motor according to a preferred embodiment of the present invention. As shown in FIG. 1, the centrifugal fan preferably includes a cylindrical or substantially cylindrical rotor unit 2 arranged to rotate about a rotation axis J, a stator unit 3 arranged inside the rotor unit 2 and a plurality of blades 52 arranged along the circumferential direction of the rotor unit 2. In this regard, the rotor unit 2 preferably includes a cylindrical or substantially cylindrical closed-top rotor holder 21, a field magnet 22 fixed to the inner surface of a sidewall portion of the rotor holder 21, and a shaft 23 fixed to the central portion of the rotor holder 21 so as to rotate about the rotation axis J.

A ring-shaped connecting portion 51 extending radially outward from the rotor unit 2 is preferably fixed to the rotor unit 2. A plurality of blades 52 arranged along the circumferential direction of the rotor unit 2 at the radial outer side of the rotor unit 2 is fixed to the connecting portion 51. The connecting portion 51 and the blades 52 together define an impeller 5. The impeller 5 is configured to rotate together with the rotor unit 2. In the present preferred embodiment, the blades 52 are preferably arranged on the outer circumferential surface of the rotor unit 2 in a mutually spaced-apart relationship. In this connection, it is only necessary that the ring-shaped connecting portion 51 has a function of fixing the blades 52 along the circumferential direction of the rotor unit 2. No particular restriction is imposed on the manner in which the connecting portion 51 is fixed to the rotor unit 2.

Figure 2:
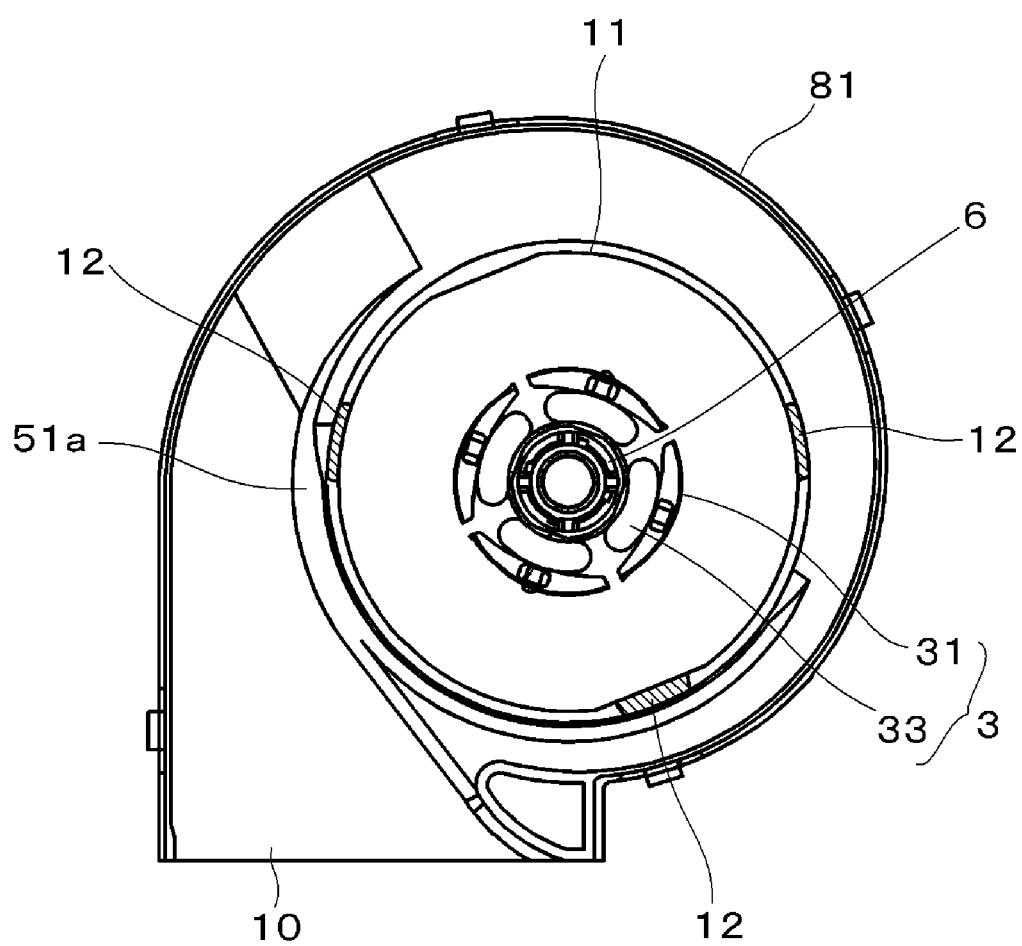
FIG. 2 is a plan view of the centrifugal fan shown in FIG. 1, with an upper cover and a rotor unit removed for clarity.

The rotor unit 2 is preferably rotatably supported by a bearing unit 4 through the shaft 23. The bearing unit 4 is fixed to the bearing holder 6. The bearing holder 6 is preferably defined together with a disc-shaped or substantially disc-shaped base 7 as a monolithic member. However, the bearing holder 6 and the base may alternatively be provided by separate members if so desired. In the present preferred embodiment, the base 7 is preferably defined by a bottom portion of a lower case 81 of a housing 8 arranged to accommodate the motor 1 including the rotor unit 2 and the stator unit 3 and the impeller 5. The bearing unit 4 is preferably provided by ball bearings, but any other desirable type of bearing could be used. The housing 8 preferably has a snail-like or substantially snail-like shape when seen in a plan view and includes a lower case 81 and an upper case 82 fitted to each other. A circular or substantially circular intake port 9 is defined in the substantially central portion of the upper case 82. As can be noted in FIG. 2 which shows the lower case 81, an exhaust port 10 which opens frontward is preferably defined on the side surface of the housing 8. The base 7 of the lower case 81 is preferably provided by a circularly depressed shape in the central region of the bottom portion of the lower case 81 by arranging a ring-shaped protrusion portion 51a in the bottom portion of the lower case 81.

The stator unit 3 fitted to the outer circumference of the bearing holder 6 is arranged inside the rotor unit 2. The stator unit 3 preferably includes a stator core 31 including a plurality of salient poles, upper and lower insulator portions 32a and 32b arranged to cover the upper and lower surfaces of the stator core 31 and the inner surfaces of slots, and a coil 33 wound around the respective salient poles of the stator core through the insulator portions 32a and 32b. The outer circumferential surfaces of the respective salient poles of the stator core 31 face the inner circumferential surface of the field magnet 22 of the rotor unit 2 across an air gap.

A disc-shaped or substantially disc-shaped circuit board 11 arranged to control the rotation of the motor 1 is preferably arranged between the base 7 and the stator unit 3. The circuit board 11 preferably has a disc-like or substantially disc-like shape. An aperture to which the bearing holder 6 is loosely fitted is preferably defined in the central portion of the circuit board 11. A plurality of tying pins 34 is preferably embedded in the lower insulator 32b of the stator unit 3. The end portions of the coil 33 are preferably tied to the tying pins 34. The respective tying pins 34 are inserted into the connecting holes of the circuit board 11 and are, for example, soldered to the circuit board 11. Thus, the circuit board 11 is supported on the stator unit 3. The end portions of the coil 33 are preferably electrically connected to a conductive pattern on the circuit board 11 through the tying pins 34. Various kinds of electronic components or elements defining a motor control circuit are preferably mounted on the lower surface of the circuit board 11.

A plurality of (for example, preferably three, in the present preferred embodiment) vibration-preventing members 12 arranged in a mutually spaced-apart relationship is interposed between the lower surface of the outer periphery portion of the circuit board 11 and the upper surface of the base 7. The circuit board 11 is supported on the base 7 through the vibration-preventing members 12. Each of the vibration-preventing members 12 is preferably defined by joining two insulative and flame-retardant rubber sheets 12a and 12b, for example. Each of the vibration-preventing members 12 is preferably fixedly secured to the circuit board 11 through the use of, for example, an adhesive agent 12c applied on the rubber sheet 12a. The upper rubber sheet 12a of each of the vibration-preventing members 12 is preferably made of, for example, a relatively soft rubber material and is, e.g., about 1 mm in thickness. The lower rubber sheet 12b is preferably made of, for example, a rubber material softer than the upper rubber sheet 12a and is, e.g., about 2 mm in thickness. The adhesive agent 12c is preferably made of a soft material identical or substantially identical to the upper rubber sheet 12a and is about 0.3 mm to about 0.4 mm in thickness, for example. As a result of joining the rubber sheets 12a and 12b, it is possible to obtain a vibration absorption range of, e.g., about 400 Hz to about 1500 Hz, so as to realize a wide vibration absorption characteristic.

The stator unit 3 is fixed to the bearing holder 6 in a position having a predetermined height and the vibration-preventing members 12 are preferably interposed in a slightly contracted state between the circuit board 11 supported on the stator unit 3 and the base 7. As a consequence, the lower surface of the lower rubber sheet 12b of each of the vibration-preventing members 12 is pressed against the upper surface of the base 7. The lower rubber sheet 12b is firmly fixed to the base 7 by the self-bonding force of the lower rubber sheet 12b. Needless to say, the lower surface of the lower rubber sheet 12b may also be fixed to the upper surface of the base 7 using an additional adhesive agent if so desired.

In the centrifugal fan configured as above, if an electric current begins to be supplied to the coil 33 of the stator unit 3, the rotor unit 2 is rotated by the electromagnetic interaction between the respective salient poles of the stator core 31 excited by the coil 33 and the field magnet 22. The impeller 5 is rotated together with the rotor unit 2. As the impeller 5 rotates, air is drawn from the intake port 9 and is centrifugally moved in the circumferential direction along with the rotation of the blades 52. The air is moved along the inner surface of the circumferential wall of the housing 8 and is blown outward from the exhaust port 10.

During this operation, electromagnetic vibration is induced between the rotor unit 2 and the stator unit 3. In the stator unit 3 supported on the bearing holder 6, the vibration is transferred to the circuit board 11 supported by the tying pins 34. Since the circuit board 11 is supported on the base 7 by the three vibration-preventing members 12, the vibration acting on the circuit board 11 is absorbed by the respective vibration-preventing members 12 and is restrained or substantially restrained from being transferred to the base 7.

Figure 3A:
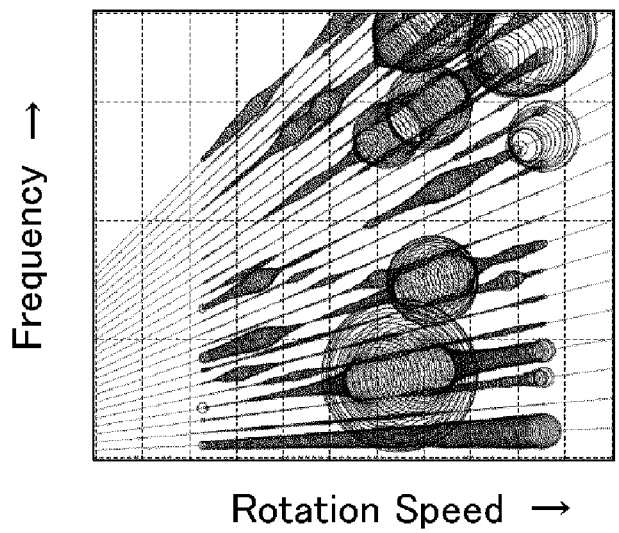
FIG. 3A is a Campbell diagram showing the axial vibration measured in a conventional centrifugal fan.
Figure 3B:
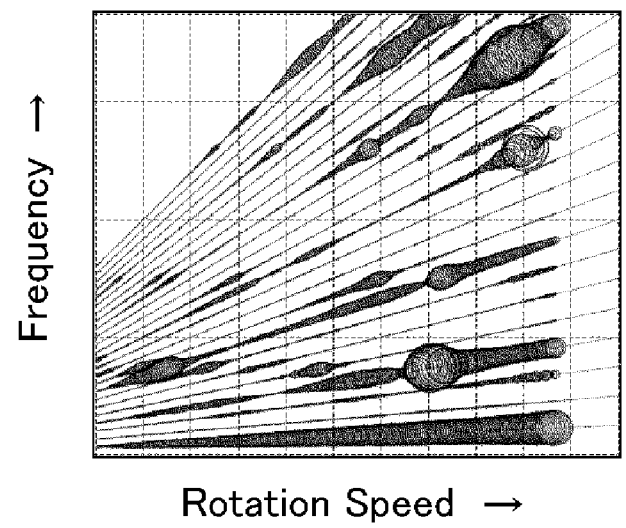
FIG. 3B is a Campbell diagram showing the axial vibration measured in the centrifugal fan shown in FIG. 1.
Figure 4A:
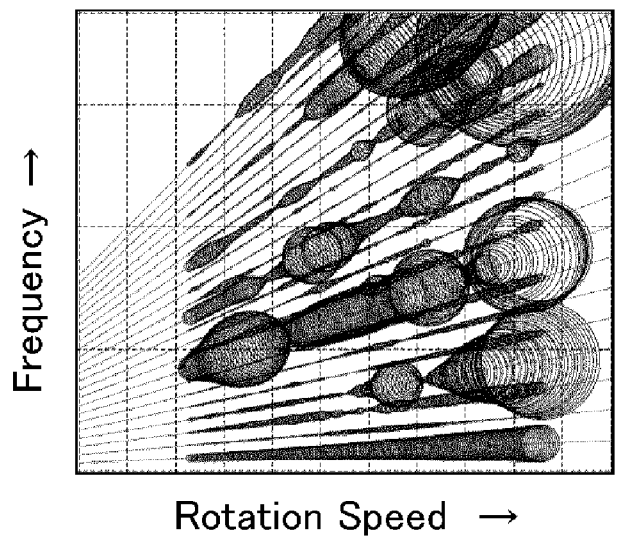
FIG. 4A is a Campbell diagram showing the radial vibration measured in a conventional centrifugal fan.
Figure 4B:
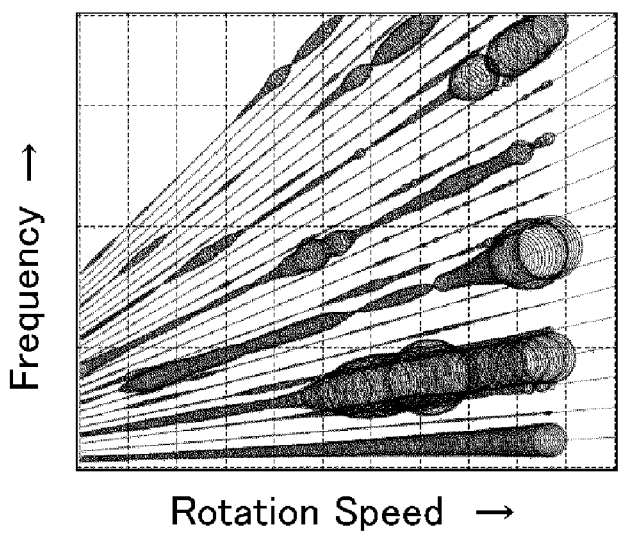
FIG. 4B is a Campbell diagram showing the radial vibration measured in the centrifugal fan shown in FIG. 1.

FIGS. 3A, 3B, 4A, and 4B are Campbell diagrams respectively showing the vibration measured in a conventional centrifugal fan not provided with the vibration-preventing members 12 and the vibration measured in a centrifugal fan according to preferred embodiments of the present invention provided with the vibration-preventing members 12. FIGS. 3A and 4A show the vibration of the conventional centrifugal fans not provided with the vibration-preventing members 12. FIGS. 3B and 4B shows the vibration of the centrifugal fans of preferred embodiments of the present invention provided with the vibration-preventing members 12. FIGS. 3A and 3B illustrate the axial vibration measured in a location corresponding to the top plate of the upper case 82 of the housing 8 near the intake port 9. FIGS. 4A and 4B illustrate the radial vibration measured in a location corresponding to the sidewall of the housing 8. A Campbell diagram indicates the vibration amplitude with the size of a circle by taking the frequency in a vertical axis, the rotation speed in a horizontal axis, and the rotation order in a tilt axis. With the Campbell diagram, it is possible to visually confirm the rotation order, the rotation speed and the frequency of the portion where the vibration amplitude is large. As is apparent in FIGS. 3A, 3B, 4A, and 4B, the provision of the vibration-preventing members 12 makes it possible to significantly reduce the axial vibration and the radial vibration.

The use of the vibration-preventing members 12 produced by joining two rubber sheets 12a and 12b differing in hardness from each other makes it possible to effectively suppress or substantially suppress the vibration in the wide frequency band before and behind the audible frequency region. Moreover, the use of the insulative and flame-retardant vibration-preventing members 12 preferably enables the vibration-preventing members 12 to directly support the circuit board 11. This makes it possible to obtain a remarkable vibration-preventing effect with a simple configuration.

While the present invention has been described on the basis of the above preferred embodiments, the aforementioned preferred embodiments are not limitative but may be modified in many different forms. For example, the motor applied to the centrifugal fan has been described in the aforementioned preferred embodiments. However, the motor can be applied to not only an axial flow fan but also to different kinds of motors in which a circuit board is supported by a stator unit in a similar manner as is the case in the aforementioned configuration.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
    a cylindrical rotor unit configured to rotate about a rotation axis;
    a bearing unit arranged to rotatably support the rotor unit;
    a bearing holder arranged to hold the bearing unit;
    a disc-shaped base to which the bearing holder is fixed;
    a stator unit arranged inside the rotor unit and fixed to the bearing holder; and
    a circuit board arranged between the base and the stator unit and held by the stator unit; wherein
    the circuit board is supported on the base through an insulative and flame-retardant vibration-preventing member;
    the vibration-preventing member is defined by two kinds of rubber sheets which are joined together, the two kinds of rubber sheets differing in hardness from one another; and
    the vibration-preventing member is fixed to the circuit board by an adhesive agent equal in hardness to one of the two kinds of rubber sheets which is arranged closest to the circuit board.

2. The motor of claim 1, wherein the vibration-preventing member includes three or more vibration-preventing members arranged on a peripheral edge portion of the circuit board in a mutually spaced-apart relationship.

3. The motor of claim 1, wherein the two kinds of rubber sheets defining the vibration-preventing member includes a first sheet having a lower hardness and a second sheet having a higher hardness than that of the first sheet, the first sheet arranged closer to the base than the second sheet.

4. The motor of claim 2, wherein the two kinds of rubber sheets defining the vibration-preventing member includes a first sheet having a lower hardness and a second sheet having a higher hardness than that of the first sheet, the first sheet arranged closer to the base than the second sheet.

5. The motor of claim 3, wherein the first sheet is larger in thickness than the second sheet.

6. The motor of claim 4, wherein the first sheet is larger in thickness than the second sheet.

7. The motor of claim 3, wherein the vibration-preventing member is fixed to the circuit board by an adhesive agent equal in hardness to the second sheet.

8. The motor of claim 4, wherein the vibration-preventing member is fixed to the circuit board by an adhesive agent equal in hardness to the second sheet.

9. The motor of claim 5, wherein the vibration-preventing member is fixed to the circuit board by an adhesive agent equal in hardness to the second sheet.

10. The motor of claim 6, wherein the vibration-preventing member is fixed to the circuit board by an adhesive agent equal in hardness to the second sheet.

11. The motor of claim 1, wherein an impeller arranged to generate an air flow while rotating together with the rotor unit is fixed to the rotor unit.

12. The motor of claim 11, wherein the impeller is a centrifugal-fan impeller including:
    a ring-shaped connecting portion fixed to the rotor unit and extending radially outward from the rotor unit; and
    a plurality of blades fixed to the connecting portion and arranged along a circumferential direction of the rotor unit at a radial outer side of the rotor unit.

13. The motor of claim 1, wherein the vibration-preventing member includes three vibration-preventing members which are spaced apart by uneven intervals with respect to one another.

\* \* \* \* \*